US010299468B2

(12) United States Patent
Aston et al.

(10) Patent No.: US 10,299,468 B2
(45) Date of Patent: May 28, 2019

(54) FISHING-HOOK-RETENTION SYSTEM AND METHOD

(71) Applicants: Eric E. Aston, Farmington, UT (US); Kenneth I. Aston, Oakley, UT (US); Timothy G. Jenkins, Heber, UT (US)

(72) Inventors: Eric E. Aston, Farmington, UT (US); Kenneth I. Aston, Oakley, UT (US); Timothy G. Jenkins, Heber, UT (US)

(73) Assignee: Tacky Fishing, LLC, American Fork, UT (US)

( * ) Notice: Subject to any disclaimer, the term of this patent is extended or adjusted under 35 U.S.C. 154(b) by 0 days.

(21) Appl. No.: 15/675,738

(22) Filed: Aug. 12, 2017

(65) Prior Publication Data

US 2018/0042209 A1    Feb. 15, 2018

Related U.S. Application Data

(60) Provisional application No. 62/374,796, filed on Aug. 13, 2016, provisional application No. 62/511,891, filed on May 26, 2017.

(51) Int. Cl.
| | |
|---|---|
| *A01K 97/06* | (2006.01) |
| *A01K 83/00* | (2006.01) |
| *A01K 99/00* | (2006.01) |

(52) U.S. Cl.
CPC ............ *A01K 97/06* (2013.01); *A01K 83/00* (2013.01); *A01K 99/00* (2013.01)

(58) Field of Classification Search
CPC ............ A01K 97/06; A45C 11/16; A47F 7/02

USPC ............ 43/54.1, 57.1, 57.2; 206/315.11, 6.1, 206/566; 224/920
See application file for complete search history.

(56) References Cited

U.S. PATENT DOCUMENTS

| | | | | |
|---|---|---|---|---|
| 142,575 | A * | 9/1873 | Martin | A47F 7/024 206/560 |
| 268,454 | A * | 12/1882 | Breidenstein | B65D 71/72 206/562 |
| 354,799 | A * | 12/1886 | McConahy | A47F 7/02 206/565 |
| 435,094 | A * | 8/1890 | Hewitt | A01K 97/06 206/476 |

(Continued)

FOREIGN PATENT DOCUMENTS

| | | | | |
|---|---|---|---|---|
| CA | 1116133 | A * | 1/1982 | ............. A01K 97/06 |
| FR | 2551320 | A1 * | 3/1985 | ............. A01K 97/06 |

(Continued)

OTHER PUBLICATIONS

Translation of JP2003-111548.*

(Continued)

*Primary Examiner* — Darren W Ark
(74) *Attorney, Agent, or Firm* — Warren M. Pate; Pate Peterson, PLLC

(57) ABSTRACT

A method for forming a system for securing items such as fishing hooks is disclosed. The method may include molding an elastomeric material to include a slit therein. Once formed, the elastomeric material may be compressed across the slit in order to reduce the width of the slit. While held in a compressed state, an item such as a fishing hook may be inserted into the slit. The compression may enable the slit to securely grip the item.

20 Claims, 14 Drawing Sheets

(56) References Cited

U.S. PATENT DOCUMENTS

| | | | | |
|---|---|---|---|---|
| 499,264 A * | 6/1893 | Troescher | B65D 71/72 | 206/562 |
| 690,399 A * | 1/1902 | Coffin | A47F 7/02 | 206/565 |
| 734,091 A * | 7/1903 | Porteck | A47F 7/024 | 206/560 |
| 862,729 A * | 8/1907 | Goldsmith | B65D 81/365 | 206/457 |
| 1,025,430 A * | 5/1912 | Sundee | E05B 65/025 | 206/566 |
| 1,133,542 A * | 3/1915 | Deal | A01K 97/06 | 2/175.3 |
| 1,240,671 A * | 9/1917 | Catala | A45C 11/16 | 206/6.1 |
| 1,305,241 A * | 5/1919 | Hendry | B65D 1/36 | 206/564 |
| 1,456,613 A * | 5/1923 | Bartels | A47F 7/03 | 206/558 |
| 1,618,561 A * | 2/1927 | Warner | A45C 11/16 | 206/564 |
| 1,799,364 A * | 4/1931 | Green | A47F 7/02 | 206/564 |
| 1,815,568 A * | 7/1931 | Jacqmein | A01K 97/06 | 206/315.11 |
| 1,954,127 A * | 4/1934 | Harsted | A01K 97/06 | 43/57.1 |
| 2,065,234 A * | 12/1936 | Martinez | A01K 97/06 | 206/315.11 |
| 2,188,987 A * | 2/1940 | Strom | A01K 97/06 | 43/57.1 |
| 2,208,649 A * | 7/1940 | Strom | A01K 97/06 | 43/57.2 |
| 2,235,369 A * | 3/1941 | Heiner | A01K 97/06 | 43/57.1 |
| 2,608,296 A * | 8/1952 | Masi, Jr. | A45C 11/16 | 206/564 |
| 2,610,430 A * | 9/1952 | Neiman | A01K 97/06 | 43/57.1 |
| 2,618,382 A * | 11/1952 | Hunter | A47F 7/02 | 206/564 |
| 2,797,806 A * | 7/1957 | Davis | A45C 11/16 | 206/457 |
| 2,801,492 A * | 8/1957 | Katvvyk | A01K 97/06 | 43/57.1 |
| 2,861,682 A * | 11/1958 | Hatcher | A47F 7/02 | 206/564 |
| 2,978,830 A * | 4/1961 | Killian | A01K 97/06 | 43/57.1 |
| 3,121,970 A * | 2/1964 | Oakes | A01K 97/06 | 43/57.1 |
| 3,453,770 A * | 7/1969 | Schultz | A01K 97/06 | 43/57.1 |
| 3,461,599 A * | 8/1969 | Sylvester | A01K 97/06 | 43/57.1 |
| 3,507,071 A * | 4/1970 | Bryson | A01K 97/06 | 43/57.1 |
| 3,769,741 A * | 11/1973 | Hessler | A01K 97/06 | 206/315.11 |
| 3,881,273 A * | 5/1975 | Herring | A01K 97/06 | 43/57.1 |
| 4,139,096 A * | 2/1979 | Sieger | A01K 97/06 | 206/315.11 |
| 4,176,491 A * | 12/1979 | Herring | A01K 97/06 | 43/57.1 |
| 4,186,511 A * | 2/1980 | Slacter | A01K 97/06 | 224/406 |
| 4,240,222 A * | 12/1980 | Covington | A01K 97/06 | 206/315.11 |
| 4,281,470 A * | 8/1981 | Anderson | A01K 97/06 | 224/920 |
| 4,282,975 A * | 8/1981 | Ovadia | A47F 7/02 | 206/443 |
| 4,287,987 A * | 9/1981 | Hoffman | A61B 17/06133 | 206/227 |
| 4,350,249 A * | 9/1982 | Caston | B65D 25/10 | 206/466 |
| 4,372,073 A * | 2/1983 | Goldman | A01K 97/06 | 224/920 |
| 4,418,490 A * | 12/1983 | Ancona | A01K 97/06 | 43/25.2 |
| 4,514,928 A * | 5/1985 | Hanson | B65H 75/18 | 43/57.2 |
| 4,573,585 A * | 3/1986 | Frei | A45C 11/16 | 206/493 |
| 4,631,856 A * | 12/1986 | Born | A01K 97/06 | 206/315.11 |
| 4,653,220 A * | 3/1987 | Olsen, Sr. | A01K 97/06 | 43/57.1 |
| 4,739,577 A * | 4/1988 | Lanius | A01K 97/06 | 312/266 |
| 4,769,941 A * | 9/1988 | Schmidt | A01K 97/06 | 43/57.1 |
| 4,883,238 A * | 11/1989 | Harder | A01K 89/016 | 24/127 |
| 4,917,235 A * | 4/1990 | Feiler | A47F 7/022 | 206/566 |
| 4,993,545 A * | 2/1991 | Feiler | A47F 7/022 | 206/566 |
| 4,995,577 A * | 2/1991 | Wood | A01K 97/06 | 248/205.3 |
| 5,428,920 A * | 7/1995 | Levin | A01K 93/00 | 43/44.89 |
| 5,505,294 A * | 4/1996 | Kilmartin, III | A47F 7/02 | 206/503 |
| 5,505,328 A * | 4/1996 | Stribiak | A01K 97/06 | 206/315.11 |
| 5,551,772 A * | 9/1996 | Keffer | A47F 7/02 | 206/6.1 |
| 5,555,671 A * | 9/1996 | Voight | A01K 97/06 | 206/315.11 |
| 5,588,245 A * | 12/1996 | Vance | A01K 97/06 | 43/25.2 |
| 5,688,860 A * | 11/1997 | Croft | C08G 18/4054 | 521/122 |
| 5,941,007 A * | 8/1999 | Reinhold | A01K 97/26 | 24/563 |
| 5,979,661 A * | 11/1999 | Sherman | A47F 7/03 | 206/566 |
| 6,026,951 A * | 2/2000 | Ovadia | A47F 7/03 | 206/566 |
| 6,059,115 A * | 5/2000 | Ovadia | A45C 11/16 | 206/562 |
| 6,079,148 A * | 6/2000 | Yonenoi | A01K 97/06 | 43/57.1 |
| 6,427,834 B1 * | 8/2002 | Lin | A01K 97/06 | 206/315.11 |
| 6,527,113 B2 * | 3/2003 | Blake | A01K 97/06 | 206/315.11 |
| 6,574,906 B1 * | 6/2003 | Meier | A01K 97/06 | 43/25.2 |
| 6,694,667 B2 * | 2/2004 | Davis | A01K 97/06 | 225/47 |
| 6,763,632 B1 * | 7/2004 | Exby | A01K 97/06 | 43/54.1 |
| 6,766,610 B1 * | 7/2004 | Lin | A01K 97/06 | 206/315.11 |
| 6,789,669 B1 * | 9/2004 | Lin | A01K 97/06 | 206/315.11 |
| 6,915,899 B2 * | 7/2005 | Lin | A01K 97/06 | 206/315.11 |
| 7,168,204 B2 * | 1/2007 | Wieringa | A01K 97/06 | 206/315.11 |
| 7,748,158 B2 * | 7/2010 | Wieringa | A01K 97/06 | 206/315.11 |
| 7,766,168 B2 * | 8/2010 | Thrapp | A45F 5/021 | 206/315.11 |
| 8,151,980 B2 * | 4/2012 | DeMartino | A47G 29/08 | 206/495 |

(56) References Cited

U.S. PATENT DOCUMENTS

| | | | | |
|---|---|---|---|---|
| 8,205,376 B1* | 6/2012 | Hughes | A01K 97/06 206/315.11 |
| 8,458,951 B2* | 6/2013 | Taylor | A01K 97/06 43/54.1 |
| D696,348 S * | 12/2013 | Dilker | D19/113 |
| 8,607,970 B2* | 12/2013 | De Lecce | A47F 7/024 206/566 |
| 8,695,273 B2* | 4/2014 | Smith | A01K 97/06 24/570 |
| 9,162,627 B2* | 10/2015 | Greiner | B60R 7/08 |
| 9,320,267 B2* | 4/2016 | Smith | A01K 97/06 |
| 9,332,868 B2* | 5/2016 | Jensen | A47G 25/746 |
| 9,414,695 B2* | 8/2016 | Steber | A47F 7/024 |
| 9,468,202 B2* | 10/2016 | Saunders | A01K 99/00 |
| 9,545,091 B2* | 1/2017 | Lockhart | A01K 97/06 |
| 9,713,324 B1* | 7/2017 | Stuart | A01K 97/06 |
| 9,913,463 B2* | 3/2018 | Aston | A01K 97/06 |
| 2001/0029646 A1* | 10/2001 | Wirtschfter | A01K 97/00 24/130 |
| 2007/0175084 A1* | 8/2007 | Moffitt | A01K 85/005 43/42.25 |
| 2008/0289988 A1* | 11/2008 | Sorensen | A01K 97/06 206/486 |
| 2009/0119974 A1* | 5/2009 | Rieux | A01K 97/06 43/54.1 |
| 2010/0170139 A1* | 7/2010 | Zhou | A01K 97/06 43/54.1 |
| 2012/0055962 A1* | 3/2012 | Lee | A45F 5/02 224/191 |
| 2013/0299363 A1* | 11/2013 | De Lecce | A47F 3/14 206/6.1 |
| 2014/0353177 A1* | 12/2014 | Senate | A45C 11/16 206/6.1 |
| 2016/0015017 A1* | 1/2016 | Heaton | A01K 97/06 43/54.1 |
| 2016/0205913 A1* | 7/2016 | Aston | A01K 97/06 |
| 2017/0086441 A1* | 3/2017 | Stanley | A01K 85/08 |
| 2017/0325441 A1* | 11/2017 | Martin | A01K 97/06 |

FOREIGN PATENT DOCUMENTS

| | | | | |
|---|---|---|---|---|
| GB | 439037 A * | 11/1935 | | A01K 97/06 |
| GB | 563829 A * | 8/1944 | | A01K 97/06 |
| GB | 634207 A * | 3/1950 | | A01K 97/06 |
| GB | 2189121 A * | 10/1987 | | A01K 97/06 |
| JP | 08214749 A * | 8/1996 | | |
| JP | 09172931 A * | 7/1997 | | |
| JP | 2001045941 A * | 2/2001 | | |
| JP | 2003111548 A * | 4/2003 | | |
| JP | 2010136673 A * | 6/2010 | | |
| JP | 5542708 B2 * | 7/2014 | | |
| KR | 20110092722 A * | 8/2011 | | |
| WO | WO-2016085303 A1 * | 6/2016 | | A01K 97/06 |

OTHER PUBLICATIONS

Translation of JP2001-045941.*
Photos of Umpqua Product Catalog, available at least early as May 1, 2017, pp. 1-9.
Declaration of Timothy G. Jenkins, pp. 1-5, dated Jan. 31, 2018.

* cited by examiner

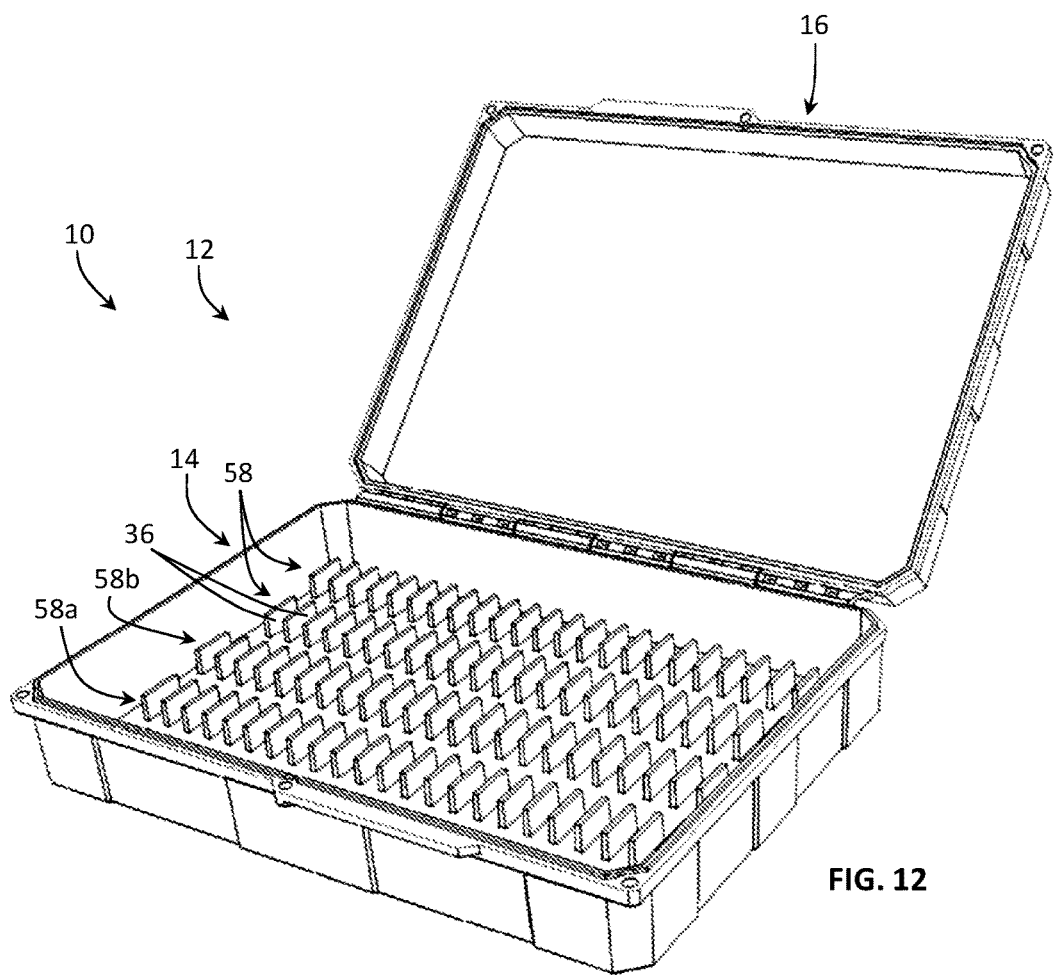
FIG. 12
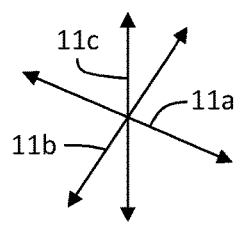

FISHING-HOOK-RETENTION SYSTEM AND METHOD

RELATED APPLICATIONS

This application claims the benefit of U.S. Provisional Patent Application Ser. No. 62/374,796 filed Aug. 13, 2016 and claims the benefit of U.S. Provisional Patent Application Ser. No. 62/511,891 filed May 26, 2017. Both U.S. Provisional Patent Application Ser. No. 62/374,796 and U.S. Provisional Patent Application Ser. No. 62/511,891 are hereby incorporated by reference.

BACKGROUND

Field of the Invention

This disclosure relates to fishing products and more particularly to systems and methods for retaining and storing fishing lures, bare fishing hooks, artificial fishing flies, and the like.

Background of the Invention

In the past, fishing tackle in the form of fishing lures, bare hooks, and artificial flies have often been stored in various compartments of a box. Such tackle has also been stored by inserting hooks into foam contained within a box. Both these approaches have significant drawbacks. For example, when multiple lures, bare hooks, or flies are stored in the same compartment, they will inevitably become entangled. Accordingly, before any lure, hook, or fly so stored may be used, it must be disentangled from the other tackle with which it has been stored.

While inserting hooks in foam does help to keep lures, bare hooks, or flies separate, it has other problems. For example, with use, foam becomes compacted and loses the ability to resiliently return to its original shape. Accordingly, the ability of the foam to support or hold tackle degrades with time. In view of these drawbacks in current systems, what is needed are new systems and method for retaining and storing fishing tackle.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIG. 12 is a perspective view of the apparatus of FIG. 11 with the inserts removed;

DETAILED DESCRIPTION OF SELECTED EMBODIMENTS

Figure 1:
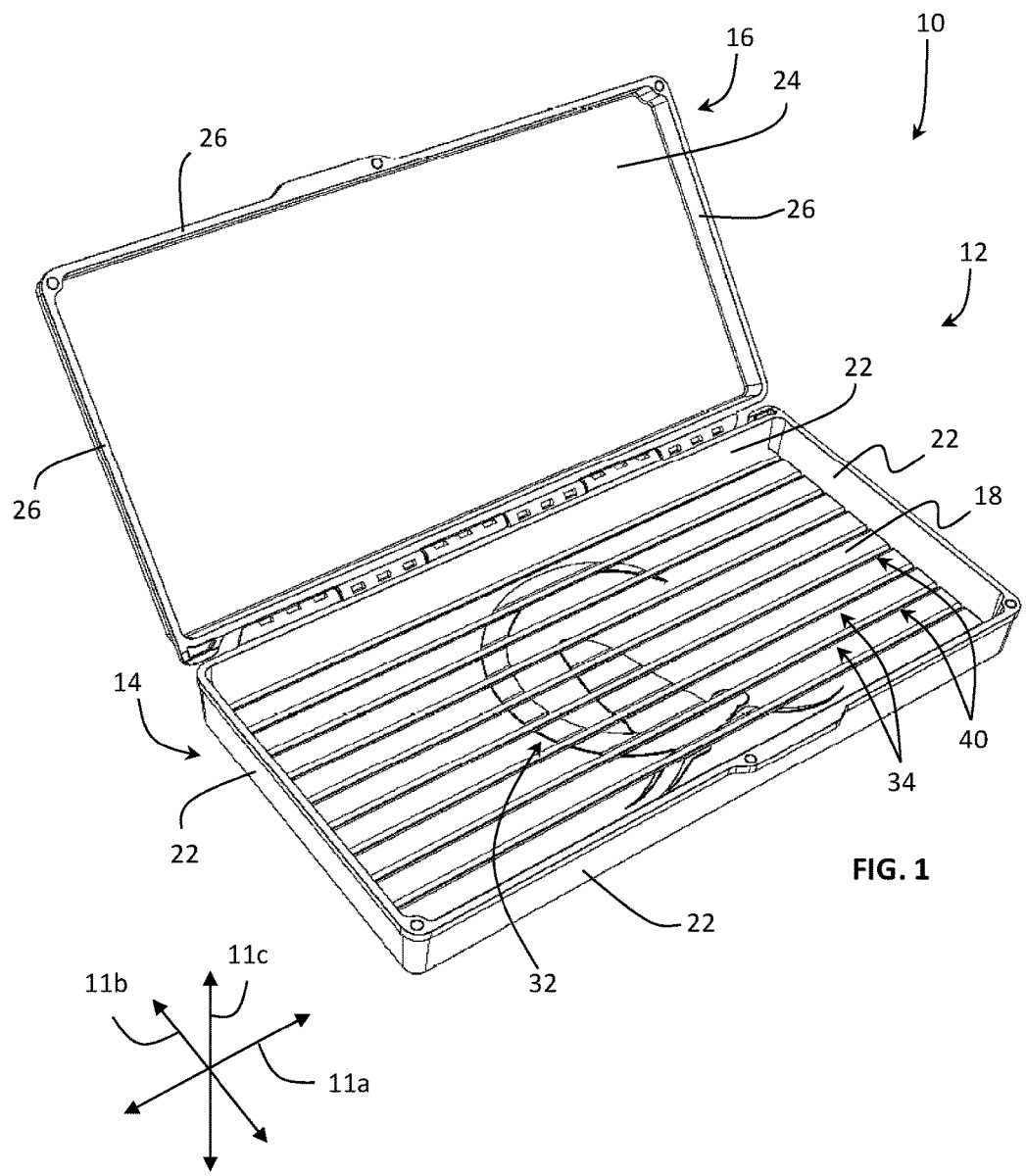
FIG. 1 is a perspective view of one embodiment of a fishing hook retention and storage apparatus in accordance with the present invention with the cover in an open position.
Figure 2:
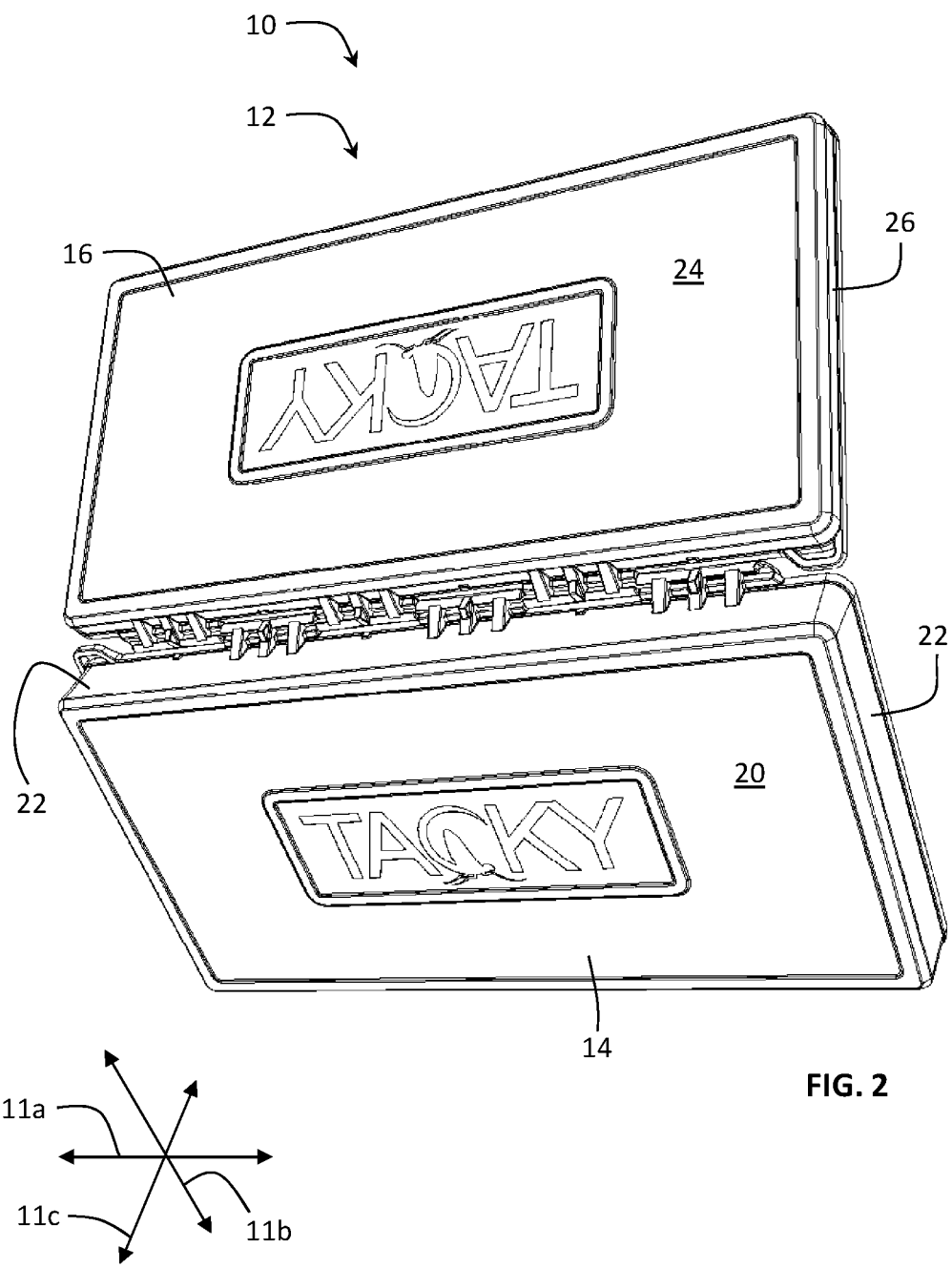
FIG. 2 is another perspective view of the apparatus of FIG. 1 with the cover in an open position.
Figure 3:
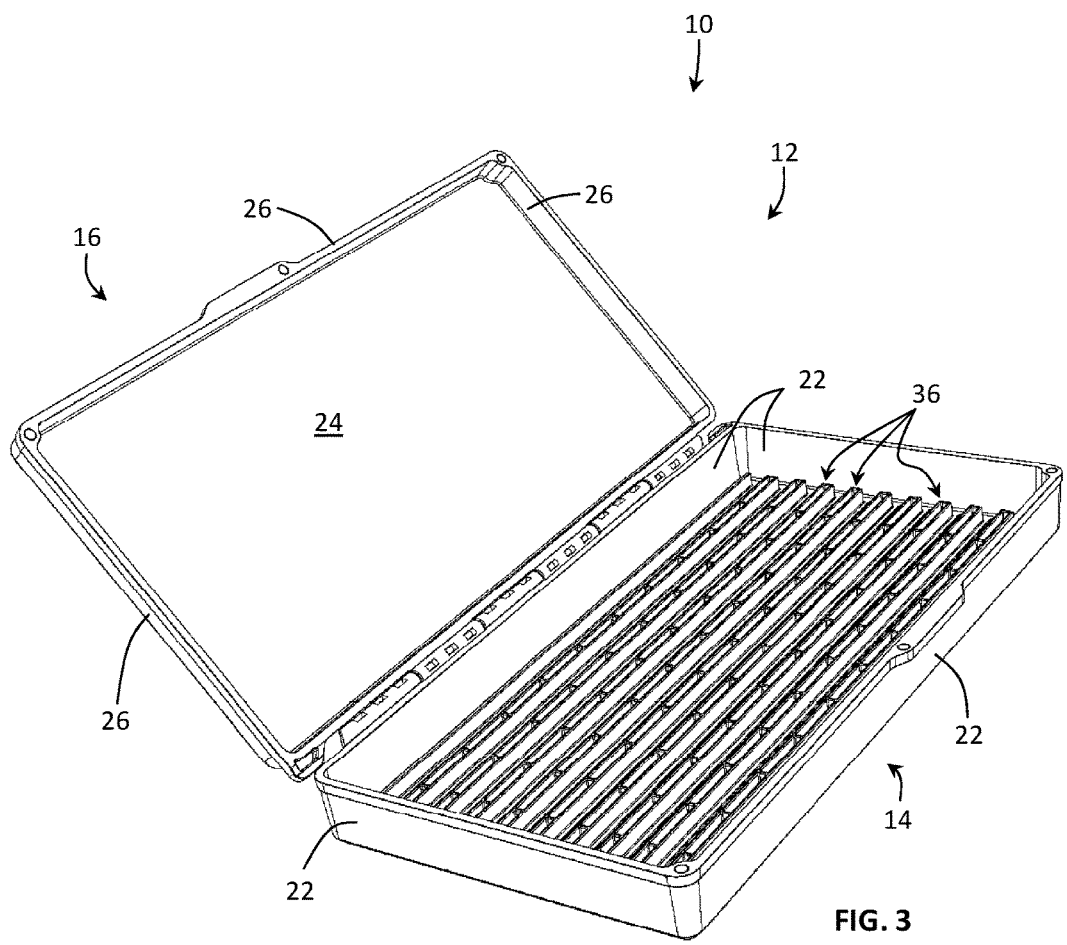
FIG. 3 is a perspective view of the apparatus of FIG. 1 with the insert removed.
Figure 3:
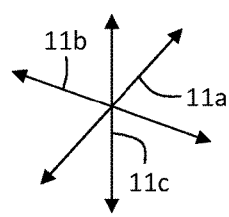
Figure 4:
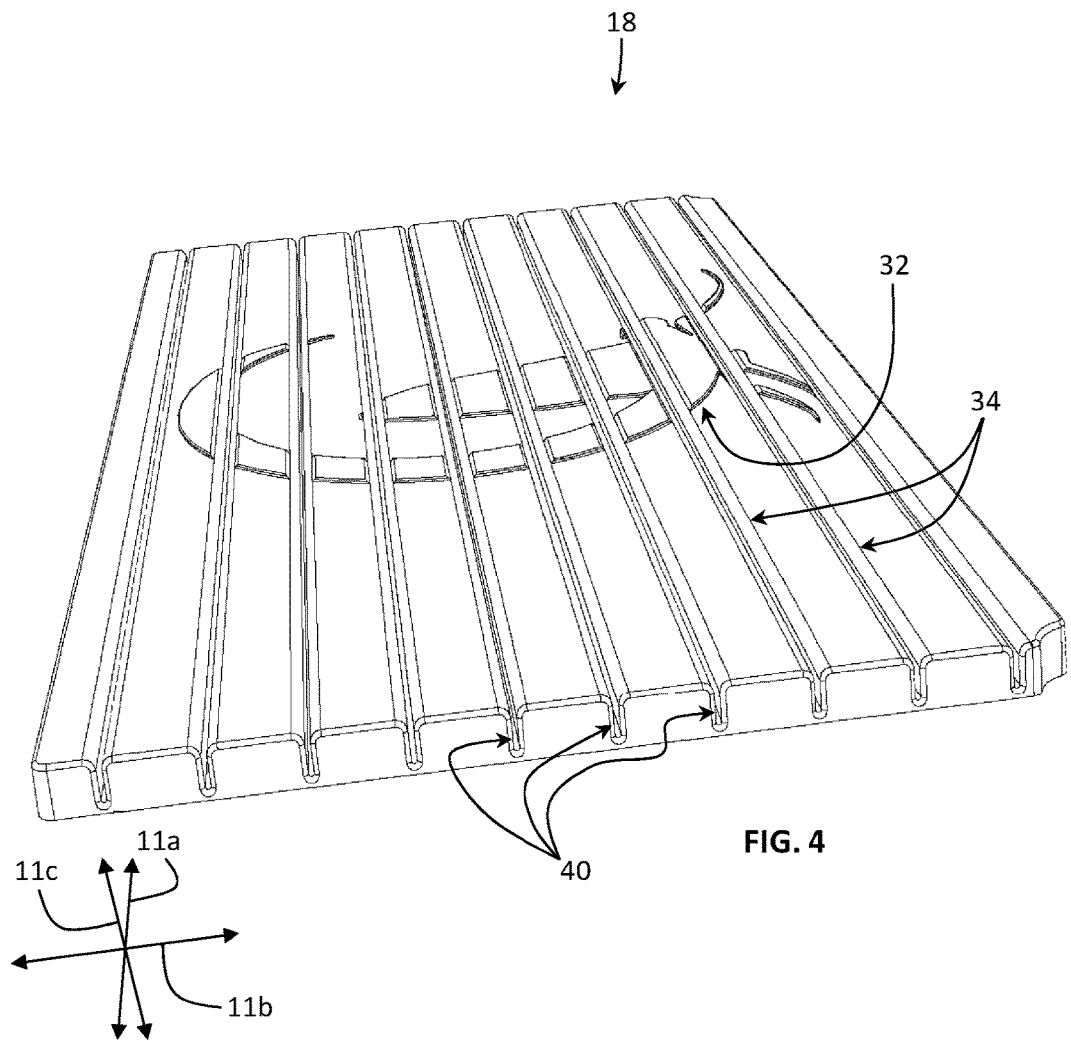
FIG. 4 is a top perspective view of the insert of the apparatus of FIG. 1.
Figure 5:
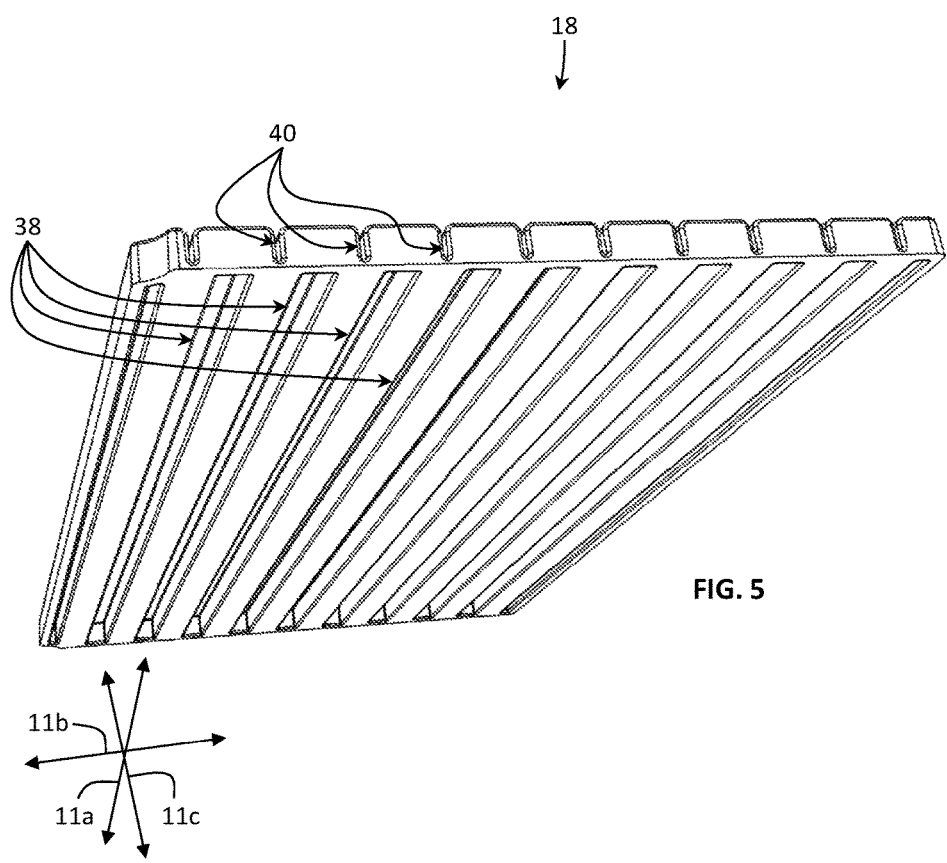
FIG. 5 is a bottom perspective view of the insert of the apparatus of FIG. 1.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

U.S. Provisional Patent Application Ser. No. 61/962,785 filed Nov. 18, 2013, U.S. patent application Ser. No. 14/547,037 filed Nov. 18, 2014, and U.S. patent application Ser. No. 15/084,162 filed Mar. 29, 2016 are each hereby incorporated by reference.

Referring to FIGS. 1-5, an apparatus 10 or system 10 in accordance with the present invention may be described in terms of longitudinal 11a, lateral 11b, and transverse 11c directions extending substantially orthogonally with respect to one another. Accordingly, in selected embodiments, an apparatus 10 or system 10 may comprise a box 12 having a length extending in a longitudinal direction 11a, a width in a lateral direction 11b, and a thickness in a transverse direction 11c.

In certain embodiments, a box 12 may include a base 14 and cover 16 and may house one or more inserts 18 (e.g., house one or more inserts 18 within a base 14, one or more inserts 18 within a cover 16, or some combination thereof). Each such insert 18 may, in turn, provide one or more locations for receiving and securing various hooks used in fishing (e.g., bare fishing hooks, hooks forming part of fishing lures, hooks forming part of artificial fishing flies, or the like). A base 14 may form or comprise a container having an interior volume. For example, a base 14 may include a back panel 20 and various side walls 22 (e.g., four side walls 20). The back panel 20 and side walls 22 may be connected (e.g., monolithically formed) together to form an open container. The interior length and width of the back panel 20 and the interior height of the side walls 22 may collectively define an interior volume corresponding to a base 14.

A cover 16 may also form or comprise a container having an interior volume. For example, a cover 16 may include a front panel 24 and various side walls 26 (e.g., four side walls 26). The front panel 24 and side walls 26 may be connected (e.g., monolithically formed) together to form an open container. The interior length and width of the front panel 24 and the interior height of the side walls 26 may collectively define an interior volume corresponding to a cover 16.

In selected embodiments, a cover 16 may pivotably engage a base 14. This may be done in any suitable manner. For example, a cover 16 may be pivotably connected to a base 14 via a barrel hinge. A cover 16 may pivot with respect to a base 14 through a range of motion. Such a range of motion may include a closed position at one extreme thereof and a fully open position at an opposite extreme thereof.

When in the closed position, a cover 16 may cooperate with a base 14 to form an enclosure. Such an enclosure may have an overall interior volume comprising the interior volume corresponding to a cover 16 and the interior volume corresponding to a base 14. For example, an enclosure may have an overall volume equal or substantially equal to the sum of the interior volume corresponding to a cover 16 and the interior volume corresponding to a base 14.

A cover 16 may have an interior volume that is different from an interior volume of a corresponding base 14. Alternatively, a cover 16 may have an interior volume that is equal or substantially equal to an interior volume of a corresponding base 14. For example, in selected embodiments, a cover 16 may be substantially identical to (e.g., produced from the same mold as) a base 14. In such embodiments, the reversed orientation of a cover 16 with respect to a base 14 may enable any hinging elements (e.g., barrels or tubular members of a barrel hinge) or the like of one to properly mesh and align with those of the other.

When in a closed position, a cover 16 may engage a base 14 to maintain an enclosure formed thereby securely closed. For example, in selected embodiments, a base 14 may comprise one or more first apertures formed therein. One or more first magnets or magnetic material may be secured within the one or more first apertures. A cover 16 may comprise one or more second apertures. One or more second magnets or magnetic material may be secured within the one or more second apertures. Moreover, the various first and second apertures and corresponding magnets or magnetic material may be positioned such that they magnetically engage one another to secure the cover 16 and base 14 in a closed position.

A base 14 and cover 16 may be formed of any suitable material or combination of materials. In selected embodiments, a base 14 and cover 16 may each comprise a molded (e.g., injection molded) polymeric material. For example, a base 14 and cover 16 may each be molded in a polycarbonate material.

A base 14 and cover 16 may have differing transparency or opacity. For example, in selected embodiments, a base 14 may be opaque or substantially opaque while a cover 16 may be transparent or substantially transparent. A transparent cover 16 may enable a user to readily see what tackle is contained within the corresponding box 12 without having to first open the box 12.

A base 14 and cover 16 or portions thereof may have differing surface finishes. In certain embodiments, a base 14, cover 16, or selected portions thereof may have a textured, roughened, or "sand blasted" look or finish, while the other or other portions may have a smooth or glossy finish. For example, the exterior surfaces of the various side walls 22, 26 may have a roughened or "sand blasted" look or finish, while the exterior surfaces of the front and back panels 20, 24 may have a smooth or glossy finish.

An insert 18 in accordance with the present invention may provide an interface between one or more fishing lures, bare hooks, flies, or the like and some other structure. For example, an insert 18 may interface between one or more fishing lures, bare hooks, artificial flies, or the like and a box 12 in accordance with the present invention, some other box or container, a fishing vest, a workbench, or the like. In certain embodiments, one or more surfaces of an insert 18 may have an icon 32, trademark 32, or the like incorporated therewithin. For example, as shown in the illustrated embodiment, a top surface of an insert 18 may have a trademark 32 incorporated therewithin (e.g., molded therewithin).

In selected embodiments, an insert 18 may comprise multiple retention sites 34. Each such retention site 34 may comprise a portion of the insert 18 that is configured to engage or retain one or more pieces of fishing tackle (e.g., one or more lures, bare hooks, flies, or the like). For example, in certain embodiments, an insert 18 may be or comprise a sheet or strip of material secured to a base 14 (e.g., secured within a base 14) and having an array of retention sites 34 distributed thereon or therewithin.

An insert 18 may comprise a sheet or strip of urethane, neoprene rubber, natural rubber, polyurethane, Buna-N rubber (i.e., nitrile butadiene rubber), thermoplastic elastomer (TPE), or other elastomeric material or the like. In selected embodiments, an insert 18 may comprise a sheet or strip of silicone rubber. The silicone rubber may have a Shore hardness in the range of about 30 A to about 70 A, more preferably in the range from about 40 A to about 60 A, and most preferably about 50 A.

In selected embodiments, an insert 18 may mechanically engage some portion of a box 12 or other substrate. For example, a base 14 and/or cover 16 or some other substrate may include one or more extensions 36 shaped to mechanically engage (e.g., extend into and/or frictionally engage) one or more corresponding apertures 38 located on an underside of an insert 18. Alternatively, or in addition thereto, an insert 18 may be secured to a base 14, cover 16, or some other substrate or structure by adhering a back face of the sheet or strip to that substrate or structure. In certain embodiments, an insert 18 may be secured within a box 12 or to some other substrate by adhering a back face of the planar sheet or strip to an interior surface of a back panel 20, a generally planar surface of some other substrate, or the like.

For example, an adhesive layer (e.g., a layer comprising a low surface energy adhesive) may directly interface between the silicone rubber and an interior surface of the back panel 20 or other substrate. In selected embodiments, an adhesive used to secure a sheet or strip of silicone rubber to the interior surface of the back panel 20 (or to some other substrate or structure) may be the 300LSE adhesive marketed by 3M. For example, a double-sided tape comprising the 300LSE adhesive may form an adhesive layer directly interfacing between a sheet or strip of silicone rubber and an interior surface of the back panel 20. In other embodiments, a silicone-based adhesive such as room temperature vulcanizing (RTV) adhesive or the like may be used to secure the insert 18 or inserts 18.

In certain embodiments, an insert 18 may comprise a sheet or strip having multiple retention sites 34 in the form of slits 40 or grooves 40 formed in the sheet or strip. For example, a retention site 34 may comprise a slit 40 having a depth extending into (e.g., most of the way through the thickness) of a sheet or strip in a transverse direction 11c and a length extending a selected distance (e.g., the length or width of the insert 18) in a longitudinal or lateral direction 11a, 11b.

In an installed configuration, the sides of a slit 40 may abut one another or nearly abut one another. Accordingly, when a fishing hook (e.g., a bare hook or a hook of a lure, artificial fly, or the like) or a portion thereof is inserted into the slit 40, the sides of the slit 40 may be pushed apart. A resiliency in the material forming the insert 18 (e.g., the material of a sheet or strip) may urge the sides of the slit 40 to return to the installed configuration. This urging may be a retaining force gripping the hook and preventing it from inadvertently exiting the slit 40.

Figure 6:
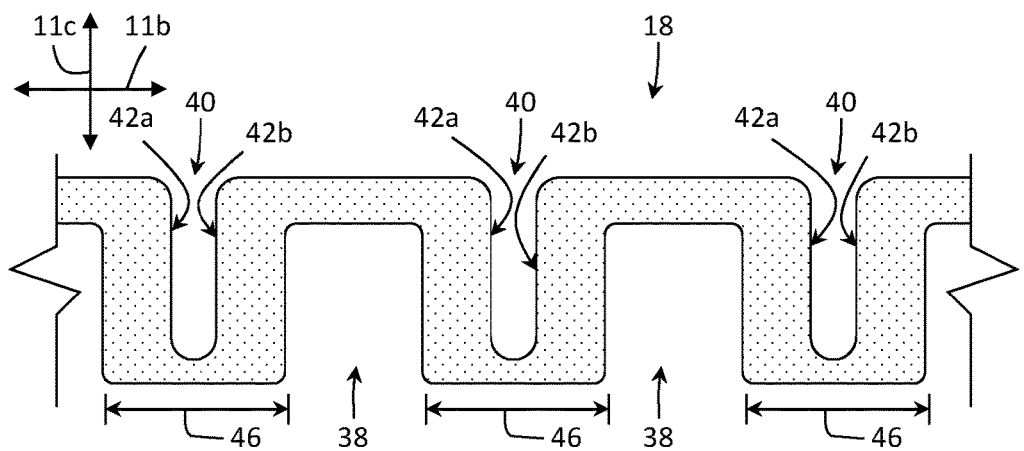
FIG. 6 is a cross-sectional view of one embodiment of an insert in accordance with the present invention, wherein the insert is in a neutral, uninstalled configuration.
Figure 7:
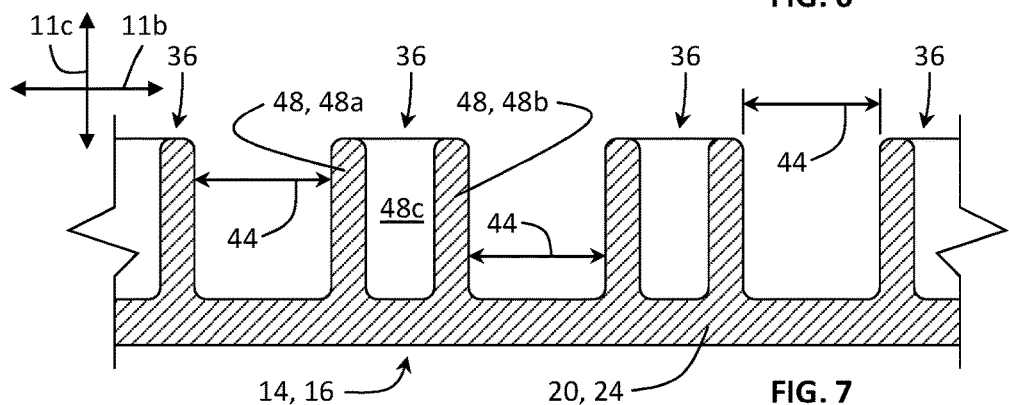
FIG. 7 is a cross-sectional view of one embodiment of a base in accordance with the present invention.
Figure 8:
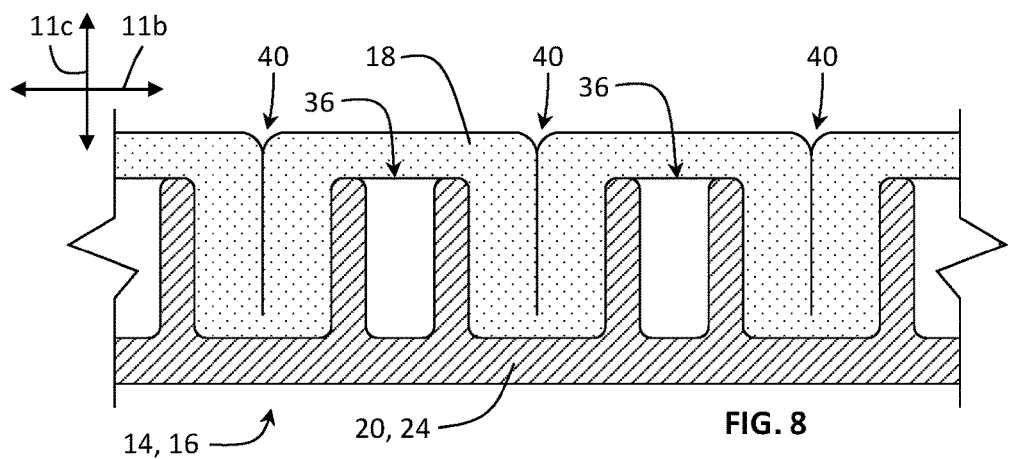
FIG. 8 is a cross-sectional view of the insert of FIG. 6 applied to the base of FIG. 7 in accordance with the present invention, wherein the base is holding the insert in a compressed, installed configuration.

Referring to FIGS. 6-8, a slit 40 or groove 40 in accordance with the present invention may be formed in any suitable manner. For example, in selected embodiments, a slit 40 may be formed by die cutting. Alternatively, a slit 40 may be formed in a molding process.

One challenge associated with molding a slit 40 is the difficulty in molding a slit 40 that is sufficiently narrow to achieve the desired functionality (e.g., gripping of a hook or other item placed therein). There is a finite limit to how thin a slit 40 can be molded. Currently that limit may be between about 0.5 mm and about 2 mm. Thus, a molded slit 40 (or even a cut slit 40 in certain applications) may provide insufficient gripping, particularly of smaller items (e.g., smaller hooks).

To overcome this limitation, a system 10 in accordance with the present invention may comprise one or more inserts 18 held, after install, in a compressed configuration. For example, an insert 18 in an installed configuration may be held in a compressed state and be shorter in at least one dimension than the insert 18 in a neutral, uninstalled configuration. The compression of an insert 18 may be in a direction that is orthogonal to one or more slits 40 thereof. Thus, the compression may tend to close the slits 40 (e.g., push opposing sides 42a, 42b of the slit 40 toward one another).

For example, in selected embodiments, an insert 18 may include one or more slits 40 extending in a longitudinal direction 11a. Accordingly, to close the one or more slits 40, the insert 18 in an installed configuration may be held in a compressed state and be shorter in the lateral direction 11b than the insert 18 in a neutral, uninstalled configuration.

In selected embodiments, an engagement between one or more extensions 36 and one or more corresponding apertures 38 located on an underside of an insert 18 may provide a mechanism for holding the insert 18 in a compressed, installed configuration. For example, each slit 40 of an insert 18 may be bracketed (e.g., bracketed in the lateral direction 11b) by two apertures 38. Each aperture 38 may be shaped and sized to receive a corresponding extension 36 forming part of a base 14, cover 16, or other substrate (e.g., substantially rigid substrate). However, when an insert 18 is in a neutral, uninstalled configuration, the distance 44 between adjacent extensions 36 may be less than the distance 46 between adjacent apertures 38. Accordingly, for each aperture 38 to receive a corresponding extension 36, at least one of the two distances 44, 46 must change.

By design, an insert 18 may be formed of a material that is substantially more compressible than the base 14, cover 16, or other substrate of which the extensions 36 form part. Thus, it is the distance 46 between adjacent apertures 38 that may be reduced to match the distance 44 between adjacent extensions 36. Since a slit 40 may be positioned between adjacent apertures 38, the reduction in the distance 46 between adjacent apertures 38 may consume at least some of the empty space between the sides 42a, 42b of the slit 40.

Alternatively, if the slit 40 is formed in a cutting processing or if there is little to no empty space between the sides 42a, 42b thereof when the corresponding insert 18 is in a neutral, uninstalled configuration, the reduction in the distance 46 between adjacent apertures 38 may generate a desired preload by forcing the sides 42a, 42b against one another. Thus, a difference between the distance 44 between adjacent extensions 36 and the distance 46 between adjacent apertures 38 (i.e., the distance 46 when the corresponding insert 18 is in a neutral, uninstalled configuration) may be selected to finely and predictably control a slit 40 width, close (completely or partially) a slit 40, generate a preload within a slit 40, or the like to produce a desired gripping effect on one or more hooks placed therewithin.

An extension 36 in accordance with the present invention may have any suitable configuration. In selected embodiments, an extension 36 may comprise a cantilevered wall 48 or wall segment 48 extending from a back panel 20, front panel 24, or other substrate. In certain embodiments, an extension 36 may comprise multiple walls 48. For example, an extension 36 may comprise two long walls 48a, 48b that extend in the longitudinal direction 11a parallel to one another from one end of a panel 20, 24 to the other and one or more cross walls 48c that are positioned between the two long walls 48a, 48b and extend in the lateral direction 11b to connect and reinforce the two long walls 48a, 48b.

Figure 9:
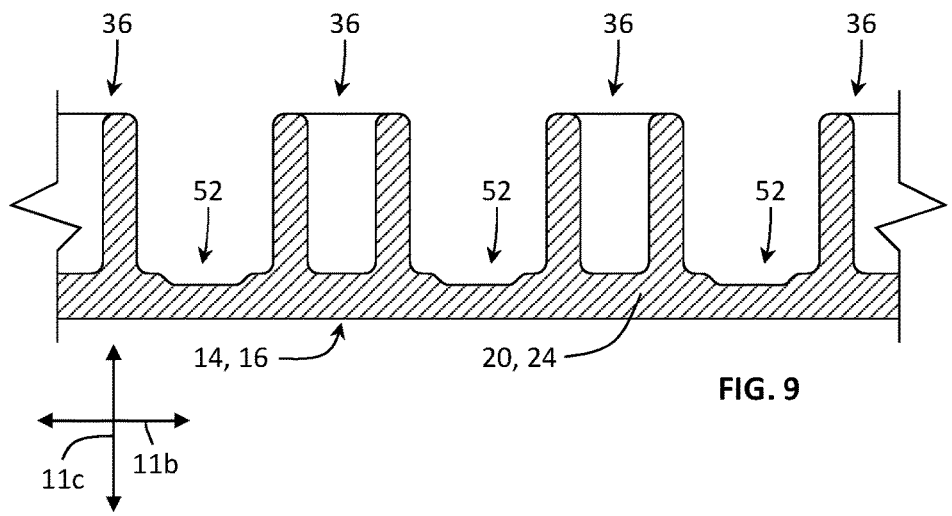
FIG. 9 is a cross-sectional view of an alternative embodiment of a base in accordance with the present invention.
Figure 10:
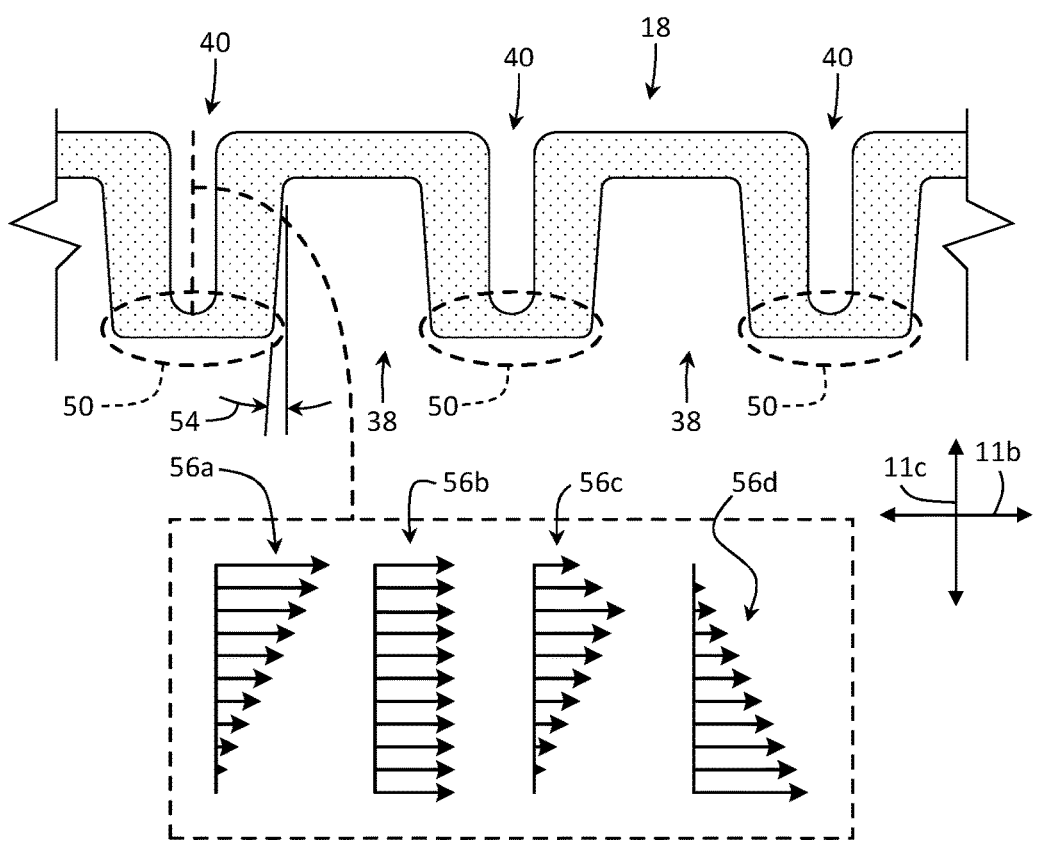
FIG. 10 is a cross-sectional view of an alternative embodiment of an insert in accordance with the present invention.
Figure 11:
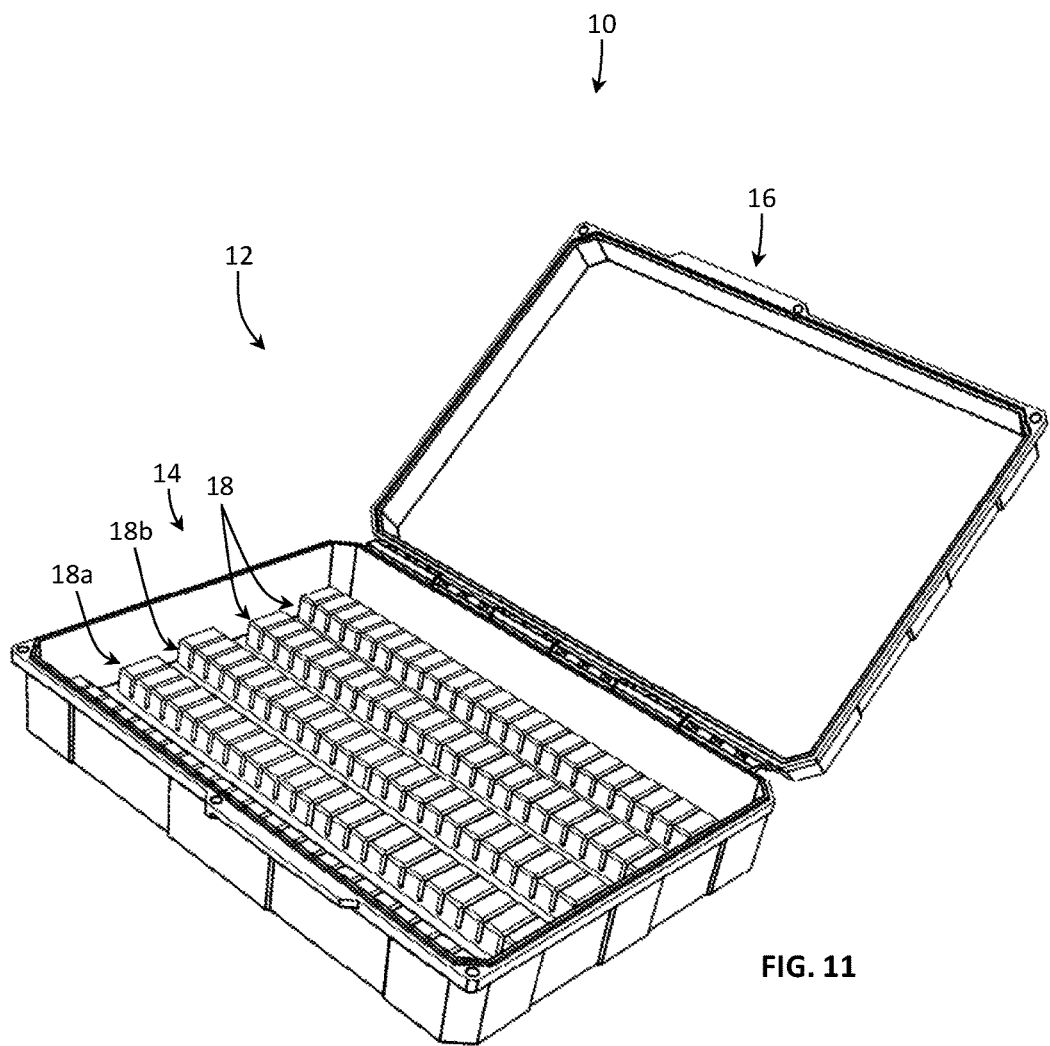
FIG. 11 is a perspective view of an alternative embodiment of a fishing hook retention and storage apparatus in accordance with the present invention with the cover formed of a transparent material, the base formed of an opaque material, and the cover in an open position.
Figure 11:
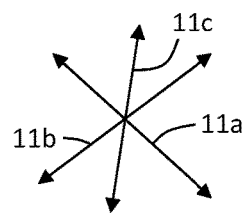
Figure 13:
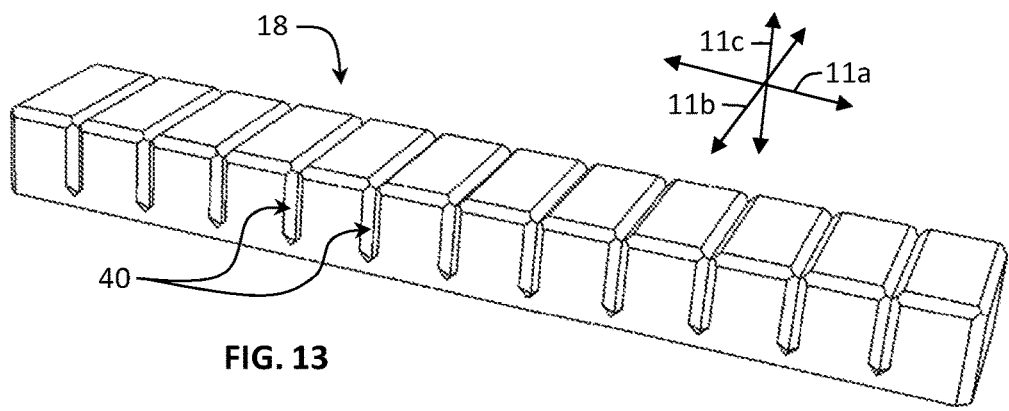
FIG. 13 is a top perspective view of an insert of the apparatus of FIG. 11, wherein the insert is in a compressed configuration.
Figure 14:
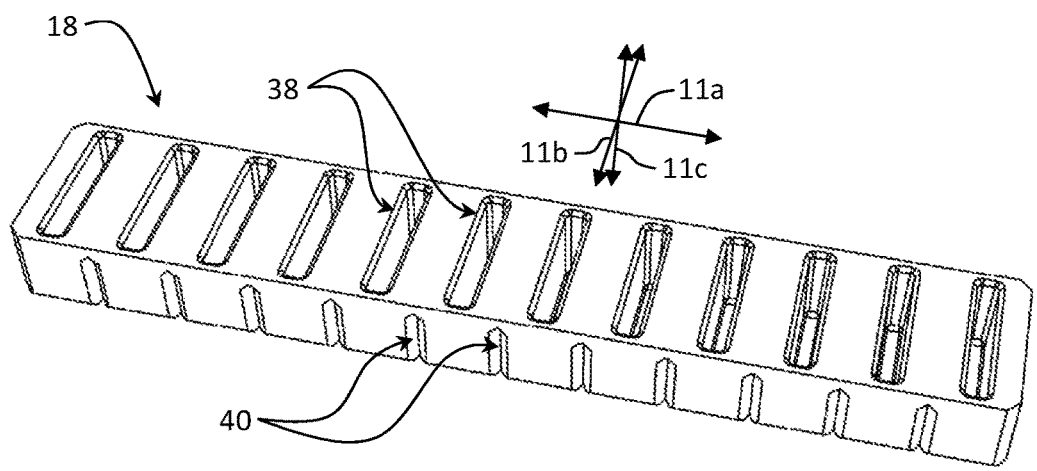
FIG. 14 is a bottom perspective view of an insert of the apparatus of FIG. 11, wherein the insert is in a compressed configuration.

Referring to FIGS. 9 and 10, in selected embodiments, compressing an insert 18 to partially or completely close one or more slits 40 may produce a relatively high pressure in an area 50 at the base of one or more slits 40. Accordingly, in certain embodiments, various features may be incorporated within a system 10 to relieve or reduce that pressure.

For example, in selected embodiments, a base 14, cover 16, or other substrate may include a recess 52. As an insert 18 is applied to such a base 14, cover 16, or other substrate, the recess 52 may provide a void into which material (i.e., material forming part of an insert 18) corresponding to or within the area 50 may deflect as it is compressed. Alternatively, or in addition thereto, one or more surfaces of an insert 18 may be angled (e.g., include draft 54 of a certain number of degrees) to reduce the amount of material in the area 50 that needs to be compressed.

By controlling the relative shape of a base 14, cover 16, or other substrate, the relative shape of one or more extensions 36, and/or the relative shape of an insert 18, the gripping force at any depth within a slit 40 (e.g., the pressure profile 56 within a slit 40 from the mouth to the root thereof) may be finely controlled. For example, by strategically increasing an amount (e.g., a thickness in a lateral direction 11*b*) of insert material (i.e., material forming part of an insert 18) at a particular location along a slit 40 somewhere between the mouth and root thereof, the force urging the slit 40 closed at that particular location may be increased. Conversely, by strategically decreasing an amount of insert material at a particular location along a slit 40, the force urging the slit 40 closed at that particular location may be decreased.

Similarly, by strategically increasing a gap (e.g., a distance 44 in a lateral direction 11*b*) between adjacent extensions 36 at a particular location along a slit 40 somewhere between the mouth and root thereof, the force urging the slit 40 closed at that particular location may be decreased. Conversely, by strategically decreasing a gap between adjacent extensions 36 at a particular location along a slit 40, the force urging the slit 40 closed at that particular location may be increased.

Thus, the relative shape of a base 14, cover 16, or other substrate, the relative shape of one or more extensions 36, and/or the relative shape of an insert 18 may be selected to provide a desired pressure profile 56 within a slit 40. For example, controlling the relative shape of a base 14, cover 16, or other substrate, the relative shape of one or more extensions 36, and/or the relative shape of an insert 18 may be used to produce: (1) a first pressure profile 56*a* where maximum pressure is applied at the mouth of the slit 40 and minimum pressure is applied at the root or bottom of the slit 40; (2) a second pressure profile 56*b* wherein the pressure applied is substantially uniform at all locations along the depth of the slit 40; (3) a third pressure profile 56*c* where the pressure is relatively low at the mouth and bottom of the slit 40 and at a maximum somewhere therebetween (e.g., at about one third of the way down into the slit 40); and (4) a fourth pressure profile 56*d* where minimum pressure is applied at the mouth of the slit 40 and maximum pressure is applied at the root or bottom of the slit 40; or the like.

Referring to FIGS. 11-14, boxes 12, inserts 18, extensions 36, apertures 38, and the like in accordance with the present invention may have any suitable size, shape, or configuration. Accordingly, systems 10 in accordance with the present invention may be adapted to various needs, situations, or applications. For example, in selected embodiments, a box 12 may contain multiple inserts 18. One or more of those inserts 18 may be held, after install, in a compressed configuration. To accommodate multiple inserts 18, one or more extensions 36 may comprise walls 48 that are relatively short in length.

For example, in the illustrated embodiment, the extensions 36 (e.g., walls 48), apertures 38, and slits 40 may be aligned with or extend in the lateral direction 11*b*. The extensions 36 (e.g., walls 48), apertures 38, and slits 40 may be relatively short such that no extension 36 extends all the way across a panel 20, 24 or other substrate in the lateral direction 11*b*.

In certain embodiments, the multiple relatively short extensions 36 may be arranged in a two-dimensional array having rows extending laterally 11*b* and columns 58 extending longitudinally 11*a*. In such embodiments, different inserts 18 may be applied to different columns 58. That is, a first insert 18*a* may be applied to (and held in a compressed configuration by) a first column 58*a*, a second insert 18*b* may be applied to (and held in a compressed configuration by) a second column 58*b*, and so forth. Thus, structures and methods in accordance with the present invention may be applied to or embodied within a variety of situations.

Figure 15:
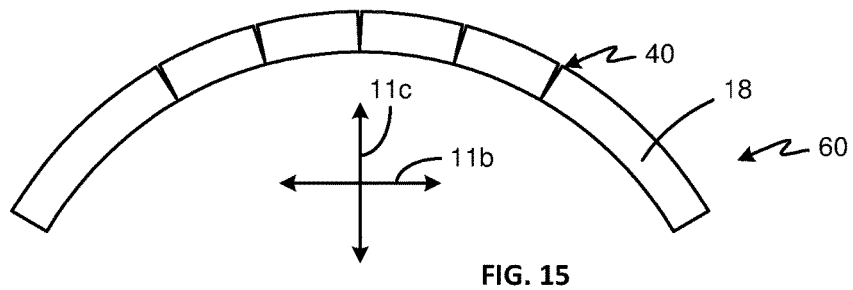
FIG. 15 is an end view of an alternative embodiment of an insert molded to include a continuous arc or curve in accordance with the present invention.
Figure 16:
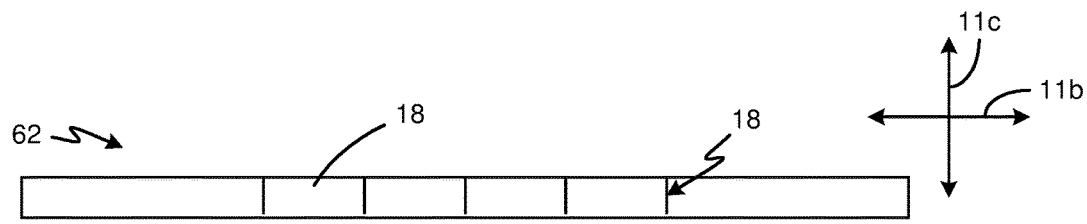
FIG. 16 is an end view of the insert of FIG. 15 deflected into a flatter configuration.
Figure 17:
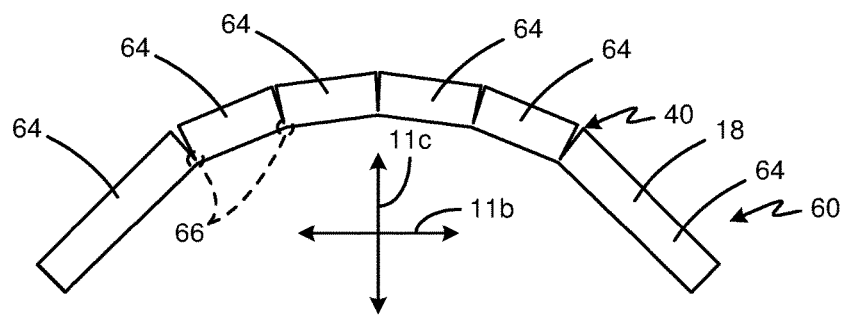
FIG. 17 is an end view of an alternative embodiment of an insert molded to include a segmented arc or curve in accordance with the present invention.

Referring to FIGS. 15-17, in selected embodiments, an insert 18 may control the compression within a slit 40 without being held in a compressed configuration by an adjacent panel 20, 24 or other substrate comprising one or more extensions 36. In certain embodiments, this may be accomplished by molding an insert 18 in an arc or curved configuration 60 and then deflecting (e.g., flattening to at least some degree) the insert 18 in order to consume any undesirable gaps in slits 40 formed in the molding process.

For example, an insert 18 may be molded such that its neutral or non-deflected configuration 60 defines an arc or curve about or with respect to an axis extending in the longitudinal direction 11*a*. Alternatively, an insert 18 may be molded such that its neutral or non-deflected configuration 60 defines an arc or curve about or with respect to an axis extending in the lateral direction 11*b*.

Various protrusions of a mold cavity (e.g., protrusions for molding one or more slits 40 into an insert 18) may extend radially from an exterior (e.g., convex side) of such an arc or curve toward an interior (e.g., concave side) of the arc or curve. That is, the various protrusions may extend generally perpendicularly with respect to a circumferential arc or direction of the insert 18. Accordingly, when the insert 18 is removed from the mold and deflected to a flatter configuration 62 for use (e.g., secured flat within a box 12), the slits 40 may close and facilitate retention of hooks therewithin.

As shown in FIG. 15, an insert 18 may be molded as a continuous arc. Alternatively, as shown in FIG. 17, an insert 18 may be molded as a segmented arc comprising a plurality of segments 64, each of which is substantially flat. In certain embodiments, protrusions for forming slits 40 may separate one such flat segment 64 from adjacent flat segments 64. Accordingly, only those portions 66 of the insert material left by the various protrusions may need to flex or bend as the insert 18 transitions from its neutral arc or curved configuration 60 to its flatter configuration 62.

In selected embodiments, one or more protrusions of a mold that form one or more slits 40 may each be formed to provide a slit 40 with an interference fit when a corresponding insert 18 is in a flatter configuration 62. The shape of such protrusions and the amount of deflection necessary to flatten an insert 18 may determine the amount or extent of such interference.

Thus, as an insert 18 transitions from an arc or curved configuration 60 to a flatter configuration 62, the opposing sides 42*a*, 42*b* of a slit 40 may first contact one another and then, with continued flattening of the insert 18, push against one another. Accordingly, in a flatter configuration 62, an interference fit may produce a compressive preload between opposing sides of a slit 40. This pre-load may improve the hook-holding properties of a slit 40 formed in a molding process.

Figure 18:
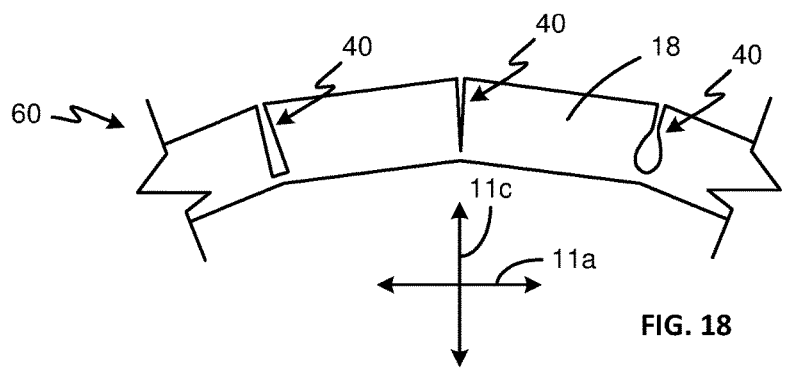
FIG. 18 is a partial end view of an alternative embodiment of an insert molded to include a segmented arc or curve and slits of various geometries in accordance with the present invention.
Figure 19:
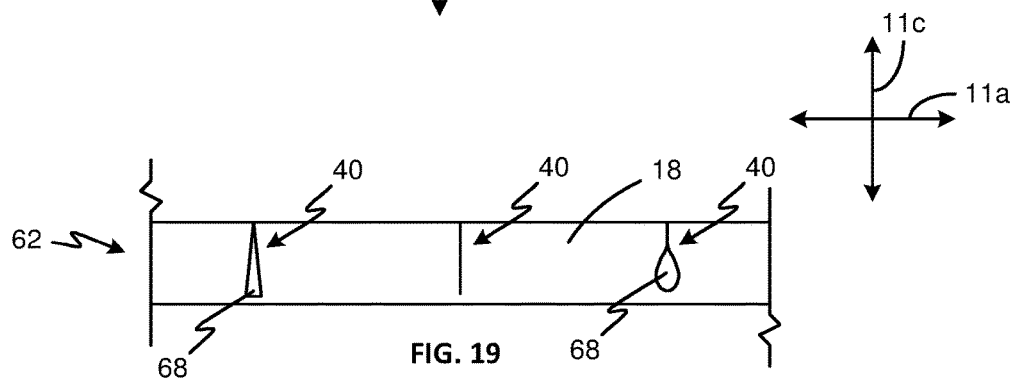
FIG. 19 is a partial end view of the insert of FIG. 18 deflected into a flatter configuration.

Referring to FIGS. 18 and 19, in selected embodiments, one or more protrusions of a mold that form one or more slits 40 may each have a positive draft. That is, they may taper down as they extend into the insert 18 during molding. For example, one or more protrusions may be formed as wedges. Such wedge-shaped protrusions may produce simple slits 40 when the insert 18 is in its flatter configuration 62.

In other embodiments, one or more protrusions of a mold that form one or more slits 40 may each have a negative draft. That is, they may taper out or wider as they extend into the insert 18 during molding. Such protrusions may produce slits 40 with interior cavities 68 that may remain open when the insert 18 is in its flatter configuration 62 or create areas of lower or pressure within a pressure profile 56. Thus, the shape of a molded slit 40 may vary based on desired properties. The slit 40 may end in a point, a square block, an arc, or the like with different hook-holding properties rendered by different terminal shapes.

Figure 20:
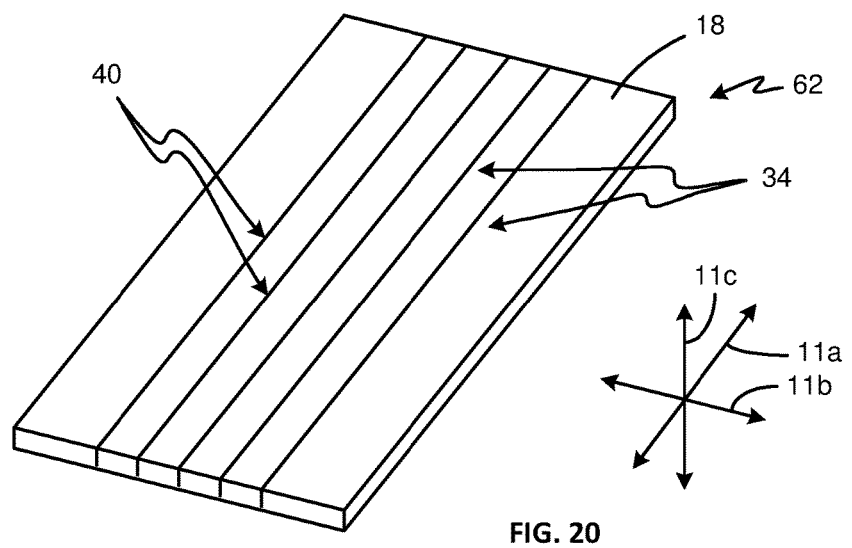
FIG. 20 is a perspective view of an insert in a flatter configuration with continuous slits molded therein in accordance with the present invention.
Figure 21:
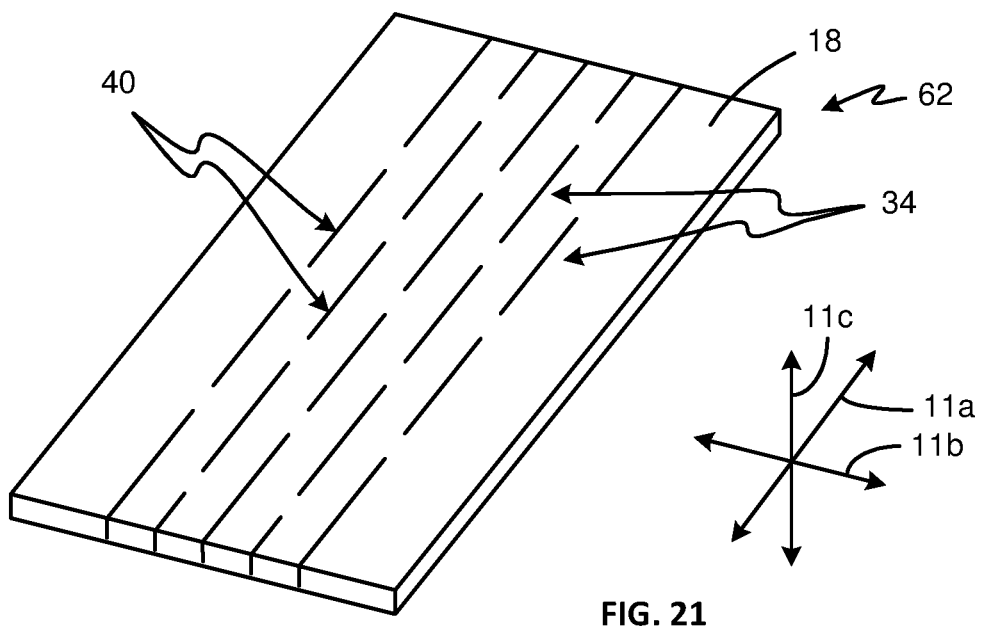
FIG. 21 is a perspective view of an insert in a flatter configuration with discontinuous slits molded therein in accordance with the present invention.
Figure 22:
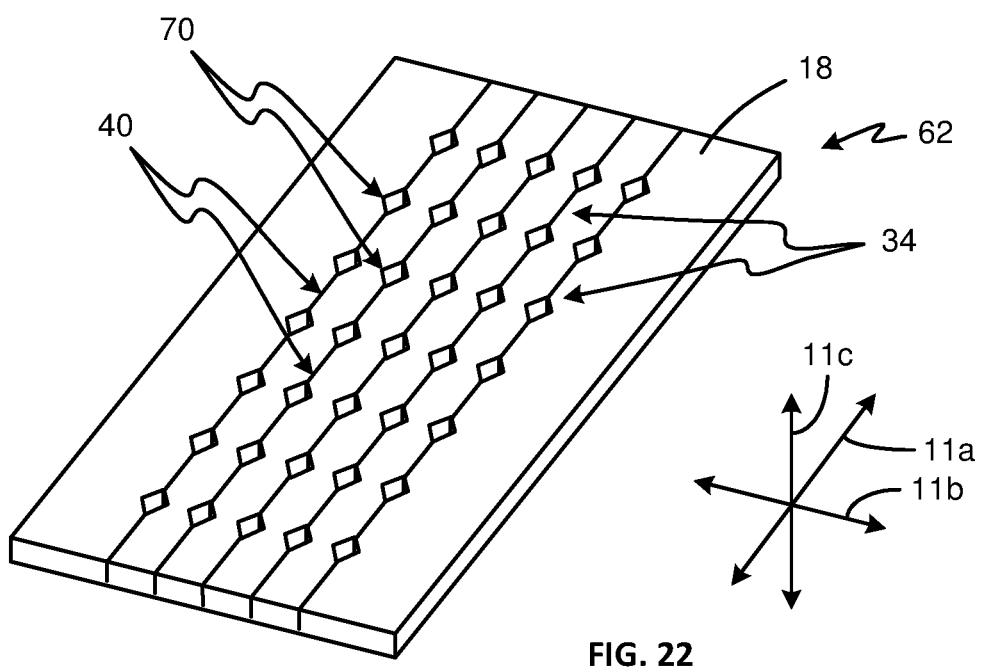
FIG. 22 is a perspective view of an insert in a flatter configuration with slits and voids are molded therein in accordance with the present invention.

Referring to FIGS. 20-22, one or more slits 40 molded in accordance with the present invention may be continuous. For example, a slit 40 may be molded to extend continuously across a length or width of an insert 18 in the longitudinal or lateral directions 11a, 11b, respectively. Alternatively, one or more slits 40 molded in accordance with the present invention may be discontinuous. That is, one or more slits 40 may be molded to extend some distance that is less than completely across a length or width of an insert 18 in the longitudinal or lateral directions 11a, 11b, respectively.

In selected embodiments, the flexibility of the material forming the insert 18 may be sufficient to accommodate or relieve stress concentrations that may be produced by flattening or compressing discontinuous slits 40. Alternatively, or in addition thereto, the discontinuities between slits 40 may be evenly distributed (e.g., staggered) so as to reduce the amount of stress concentrated in any particular location.

In certain embodiments, one or more slits 40 may be molded to include one or more voids 70. For example, a slit 40 may have one or more voids 70 distributed therealong. A void 70 may have a depth extending completely or partially through an insert 18 in a transverse direction 11c. In selected embodiments, a void 70 may assist a user in securing a fishing hook (e.g., a bare hook or a hook of a lure, artificial fly, or the like) within a slit 40. For example, a void 70 may enable a user to better see where a hook or the like may be secured, as a slit 40 by itself may be more difficult to discern. Additionally, a void 70 may physically channel, guide, or direct a hook or the like into a slit 40, thereby making it easier for a user to secure the hook at a retention site 42. That is, a user may first introduce a hook into a void 70 and then progress into a corresponding slit 40 so that the slit 40 can grip the hook.

In selected embodiments, a void 70 may be shaped and oriented to point toward or into a slit 40. For example, a void 70 may have a profile like that of a tear drop with the point thereof aligned with (e.g., pointed into) a corresponding slit 40. Other voids 70 may similarly point, but have other profiles such as triangles, diamonds, or the like. Still other voids 48 may have a profile like a circle, ellipse, half circle, half ellipse, rectangle, square, or the like.

Figure 23:
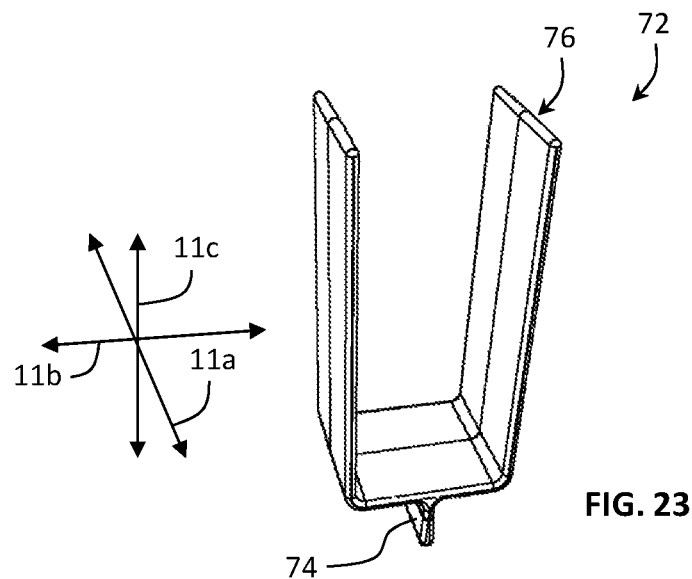
FIG. 23 is a perspective view of one embodiment of a stabilizer in accordance with the present invention.
Figure 24:
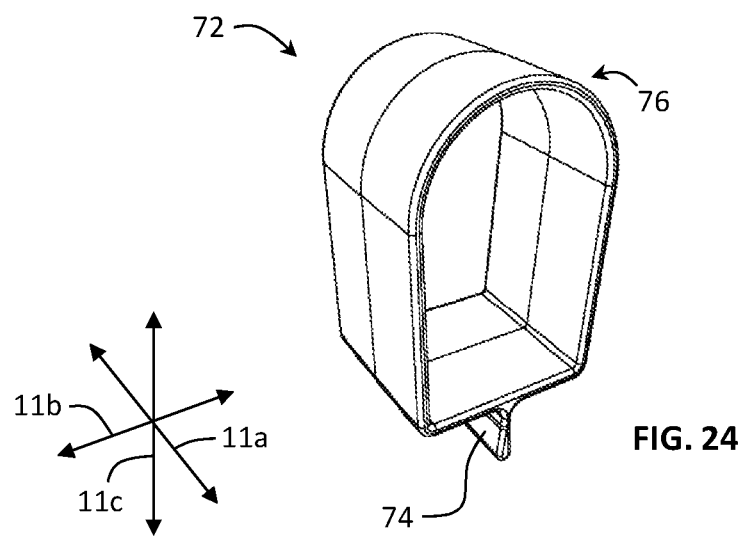
FIG. 24 is a perspective view of an alternative embodiment of a stabilizer in accordance with the present invention.

Referring to FIGS. 23 and 24, in selected embodiments, a system 10 may include various accessories 72. Such accessories 72 may enhance the functionality of a system 10. For example, in certain embodiments, a system 10 may include one or more stabilizers 72. A stabilizer 72 may have one end 74 configured to engage (e.g., be inserted within) a slit 40. The other end 76 may extend away from a slit 40 to engage, bracket, stabilize, immobilize, etc. one or more pieces of fishing tackle (e.g., fishing lures or the like) or portions thereof. This may prevent one piece of fishing tackle from contacting, snagging, scratching, etc. one or more neighboring pieces of fishing tackle.

Inserts 18 having one or more features disclosed hereinabove may be used in a wide variety of locations or situations. Inserts 18 may be applied to any substrate that has sufficient rigidity (e.g., sufficient rigidity to hold an insert 18 or selected portions thereof in a compressed configuration, sufficient rigidity to hold an arcuately molded insert 18 in a flatter configuration, etc.). As discussed above, in selected embodiments, the substrate may form part of a fishing tackle box (e.g., a back panel 20 of a fly box). In other embodiments, a substrate may be part of some other item such as a boat (e.g., a side wall, a dash board, or some other part of a boat), fishing pack, fishing vest, brim of a hat, or the like.

Alternatively, an insert 18 may be applied to a generally planar substrate that is a standalone item (e.g., an item dedicated substantially exclusively to providing sufficient rigidity for the insert 18). That is, an insert 18 and corresponding substrate may form a standalone item that may be used independent of any fishing tackle box. For example, an insert 18 may be applied to a generally planar surface of a substrate formed of polymeric material, wood, metal, composite material, or the like (e.g., a surface that has a perimeter that corresponds to or closes tracks that of the insert 18).

Inserts 18 having one or more features disclosed hereinabove may be used to secure a wide variety of items. As discussed above, in selected embodiments, inserts 18 may have retention sites 34 sized to receive and grip fishing tackle (e.g., fishing hooks in various forms). In other embodiments, inserts 18 may have retention sites 34 sized to receive and grip other items such as jewelry (e.g., rings, earrings, etc.), tools, or any other items for which individualized retention and storage is desired. Thus, in certain embodiments, an insert 18 may be applied to or included within a jewelry box, tool box, or the like.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A method comprising:
   obtaining a monolithic piece of elastomeric material, the monolithic piece comprising
   a slit formed therein,
   a first aperture formed therein on one side of the slit, and
   a second aperture formed therein on an opposite side of the slit such that a first distance separates the first aperture from the second aperture;
   obtaining a substrate comprising a first extension and a second extension, wherein a second distance that is less than the first distance separates the first extension from the second extension; and reducing a width of the slit by applying the monolithic piece to the substrate such that the first and second extensions respectively engage the first and second apertures.

2. The method of claim 1, wherein the slit, first aperture, and second aperture do not extend all the way through the monolithic piece.

3. The method of claim 2, wherein:
the monolithic piece further comprises a top surface and a bottom surface opposite the top surface; and
the slit opens at the top surface and the first and second apertures both open at the bottom surface.

4. The method of claim 3, wherein:
the substrate forms part of a box that selectively opens and closes; and
the applying the monolithic piece to the substrate comprises securing the monolithic piece within an interior of the box.

5. The method of claim 1, further comprising storing an item by wedging, after the reducing, at least a portion of the item into the slit.

6. The method of claim 5, wherein the at least a portion of the item comprises at least a portion of a fishing hook.

7. A method comprising:
molding raw material in a mold to form a monolithic piece of elastomeric material, the molding forming within the monolithic piece a slit, a first aperture on one side of the slit, and a second aperture on an opposite side of the slit such that a first distance separates the first aperture from the second aperture;
obtaining a substrate comprising a first extension and a second extension, wherein a second distance that is less than the first distance separates the first extension from the second extension; and
reducing a width of the slit by applying the monolithic piece to the substrate such that the first and second extensions respectively engage the first and second apertures.

8. The method of claim 7, wherein:
the molding forms on the monolithic piece a top surface and a bottom surface opposite the top surface; and
the slit opens at the top surface and does not extend to the bottom surface;
the first and second apertures both open at the bottom surface and do not extend to the top surface.

9. The method of claim 7, further comprising storing an item by wedging, after the reducing, at least a portion of the item into the slit.

10. A method comprising:
molding raw material in a mold to form a monolithic piece of elastomeric material;
the molding comprising forming within the monolithic piece a slit having
a length extending in a first direction,
a width extending in a second direction orthogonal to the first direction, and
a depth extending in a third direction orthogonal to the first direction and the second direction;
the molding further comprising forming within the monolithic piece a first aperture on one side of the slit and a second aperture on an opposite side of the slit such that a first distance separates the first aperture from the second aperture;
obtaining a substrate comprising a first extension shaped to fit within the first aperture and a second extension shaped to fit within the second aperture, wherein a second distance that is less than the first distance separates the first extension from the second extension; and
reducing, after the molding, the width of the slit in the second direction by applying the monolithic piece to the substrate such that the first and second extensions respectively engage the first and second apertures.

11. The method of claim 10, wherein the molding further comprises:
forming the monolithic piece to have a top surface and a bottom surface opposite the top surface; and
forming the monolithic piece such that the slit opens at the top surface and the first and second apertures both open at the bottom surface.

12. The method of claim 11, wherein the molding further comprises forming other slits in the monolithic piece, the other slits extending parallel to the slit.

13. The method of claim 12, wherein each slit of the other slits comprises:
a length extending in the first direction;
a width extending in the second direction; and
a depth extending in the third direction.

14. The method of claim 13, wherein the reducing comprises reducing the width of each slit of the other slits by compressing one or more portions of the monolithic piece in the second direction.

15. The method of claim 14, wherein the molding further comprises forming the monolithic piece to be planar such that the top surface is substantially parallel to the bottom surface.

16. The method of claim 15, wherein the elastomeric material comprises silicone rubber having a Shore hardness in a range from about 40 A to about 60 A.

17. The method of claim 16, wherein the silicone rubber has a Shore hardness of about 50 A.

18. The method of claim 15, wherein the substrate forms part of a box that selectively opens and closes.

19. The method of claim 18, wherein the applying the monolithic piece to the substrate comprises securing the monolithic piece within an interior of the box.

20. The method of claim 10, further comprising:
storing, while the first and second extensions respectively engage the first and second apertures, an item by placing at least a portion of the item within the slit; and
gripping, by the monolithic piece after the placing, the at least a portion of the item within the slit.

* * * * *